(12) United States Patent
Daniel

(10) Patent No.: US 6,203,074 B1
(45) Date of Patent: Mar. 20, 2001

(54) DUCT SYSTEM AND METHOD

(76) Inventor: Carter L. Daniel, 8509 Mulberrry St., Laurel, MD (US) 20707

( * ) Notice: Subject to any disclaimer, the term of this patent is extended or adjusted under 35 U.S.C. 154(b) by 0 days.

(21) Appl. No.: 09/174,667

(22) Filed: Oct. 19, 1998

(51) Int. Cl.$^7$ .................................................. F16L 25/00
(52) U.S. Cl. ........................ 285/424; 285/334.2; 285/915
(58) Field of Search .......................... 285/370, 397, 285/915, 405, 424, 334.2; 138/DIG. 4

(56) References Cited

U.S. PATENT DOCUMENTS

| | | | |
|---|---|---|---|
| 431,697 | * 7/1890 | Kummel | 138/158 |
| 3,508,766 | * 4/1970 | Kessler et al. | 285/21.1 |
| 3,512,805 | * 5/1970 | Glatz | 285/424 |
| 3,836,181 | * 9/1974 | Kelver | 285/424 |
| 4,249,758 | 2/1981 | Harris . | |
| 4,690,434 | * 9/1987 | Schmidt | 285/915 |
| 4,819,972 | 4/1989 | Champa et al. . | |
| 5,016,920 | * 5/1991 | Anderson | 285/334.2 |
| 5,095,942 | 3/1992 | Murphy . | |
| 5,219,403 | 6/1993 | Murphy . | |
| 5,505,497 | 4/1996 | Shea et al. . | |
| 5,971,438 | * 10/1999 | Johnson | 285/397 |

* cited by examiner

Primary Examiner—Lynne H. Browne
Assistant Examiner—Aaron Dunwoody
(74) Attorney, Agent, or Firm—J. Stewart Brams

(57) ABSTRACT

Internal connectors are configured to conformingly fit within each of the mating ends of adjacent duct elements. The internal connectors each comprise a sleeve having an outwardly extended wall disposed about a perimeter of the internal connector. The mating ends each have a stepped face configured to conformingly mate with the internal connector. To connect the duct elements together, the mating ends are mated to each side of the internal connector and the mating ends are glued to each other. Because the mating ends and the internal connectors conformingly mate with each other, the duct elements will be aligned with each other. The internal connectors are glued to a side wall of the duct element wherever branch take-offs are made.

4 Claims, 5 Drawing Sheets

DUCT SYSTEM AND METHOD

BACKGROUND OF THE INVENTION

1. Field of the Invention

The present invention relates to duct systems for heating, cooling and ventilating applications.

2. Description of the Related Art

Many duct systems of the prior art require complicated connectors between components, having metal bands and gaskets, and requiring significant labor for installation. What is needed is a duct system which is quickly and easily installed.

SUMMARY OF THE INVENTION

The duct system of the present invention is constructed of plastic, similar to the material used for conventional, plastic potable water piping systems in buildings. Internal connectors are configured to conformingly fit within each of the mating ends of adjacent duct elements. The internal connectors each comprise a sleeve having an outwardly extended wall disposed about a perimeter of the sleeve. The mating ends each have a stepped face configured to conformingly mate with the internal connector.

To connect the duct elements together, the mating ends are mated to each side of the internal connector and the mating ends are glued to each other. Because the mating ends and the internal connectors conformingly mate with each other, the duct elements will be aligned with each other. The internal connectors are glued to a side wall of the duct element wherever branch take-offs are made.

Still further features and advantages will become apparent from the ensuing description and drawings.

DETAILED DESCRIPTION

Figure 1:
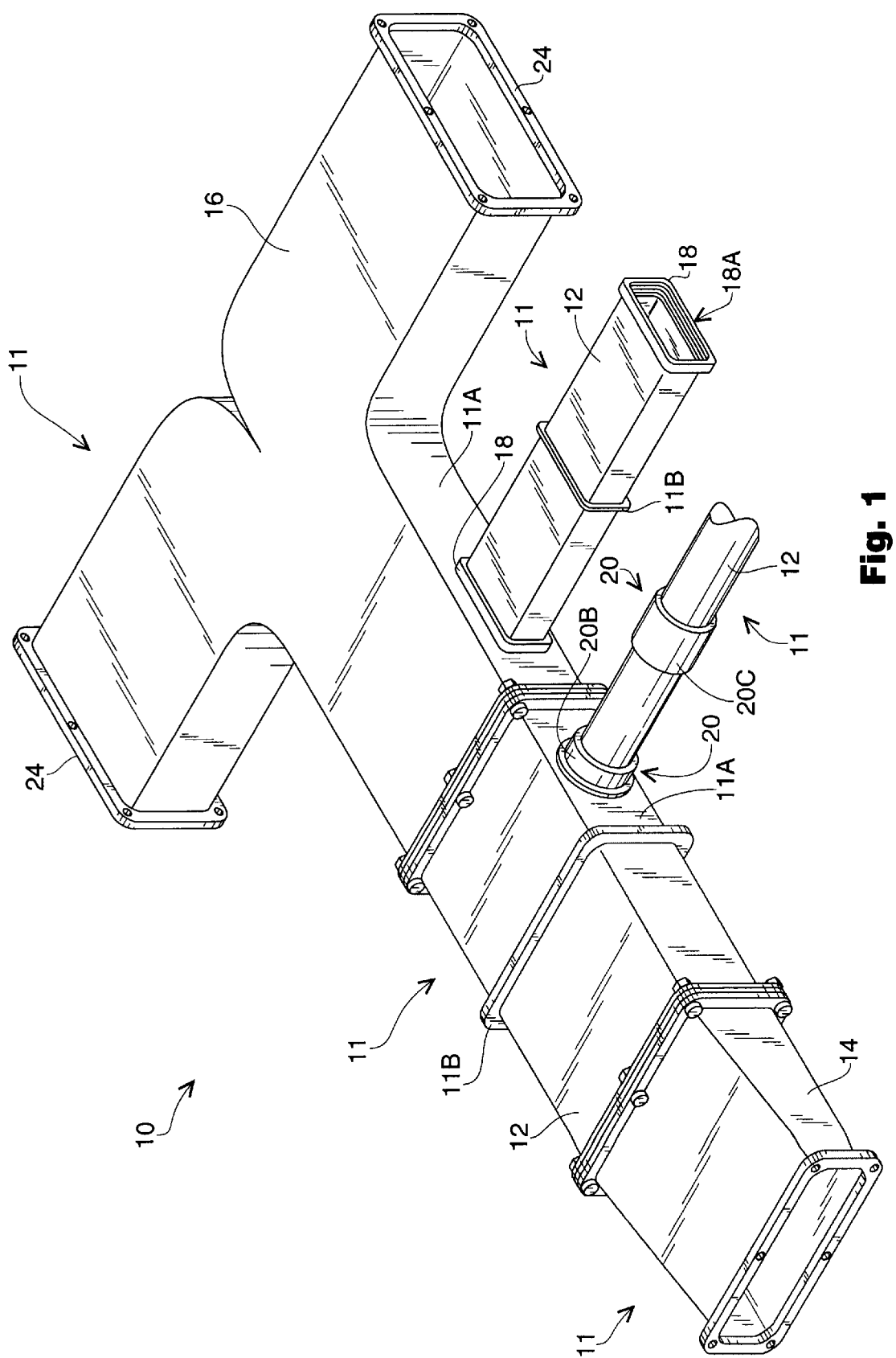
FIG. 1 is a perspective view of a duct system of the present invention.

FIG. 1 is a perspective view of a duct system 10 of the present invention. The duct system 10 generally resembles a conventional duct system, having duct elements 11 which include straight sections 12, transition fittings 14, divided flow fittings 16 and the like, such fittings being generally well known in the art. The mating ends 18 and the connectors 20 are unique to the present invention. The duct system 10 is constructed of plastic, similar to the material used for conventional, plastic potable water piping systems in buildings. The duct elements 11 include reinforcing flanges 11B where needed for greater rigidity.

Figure 2:
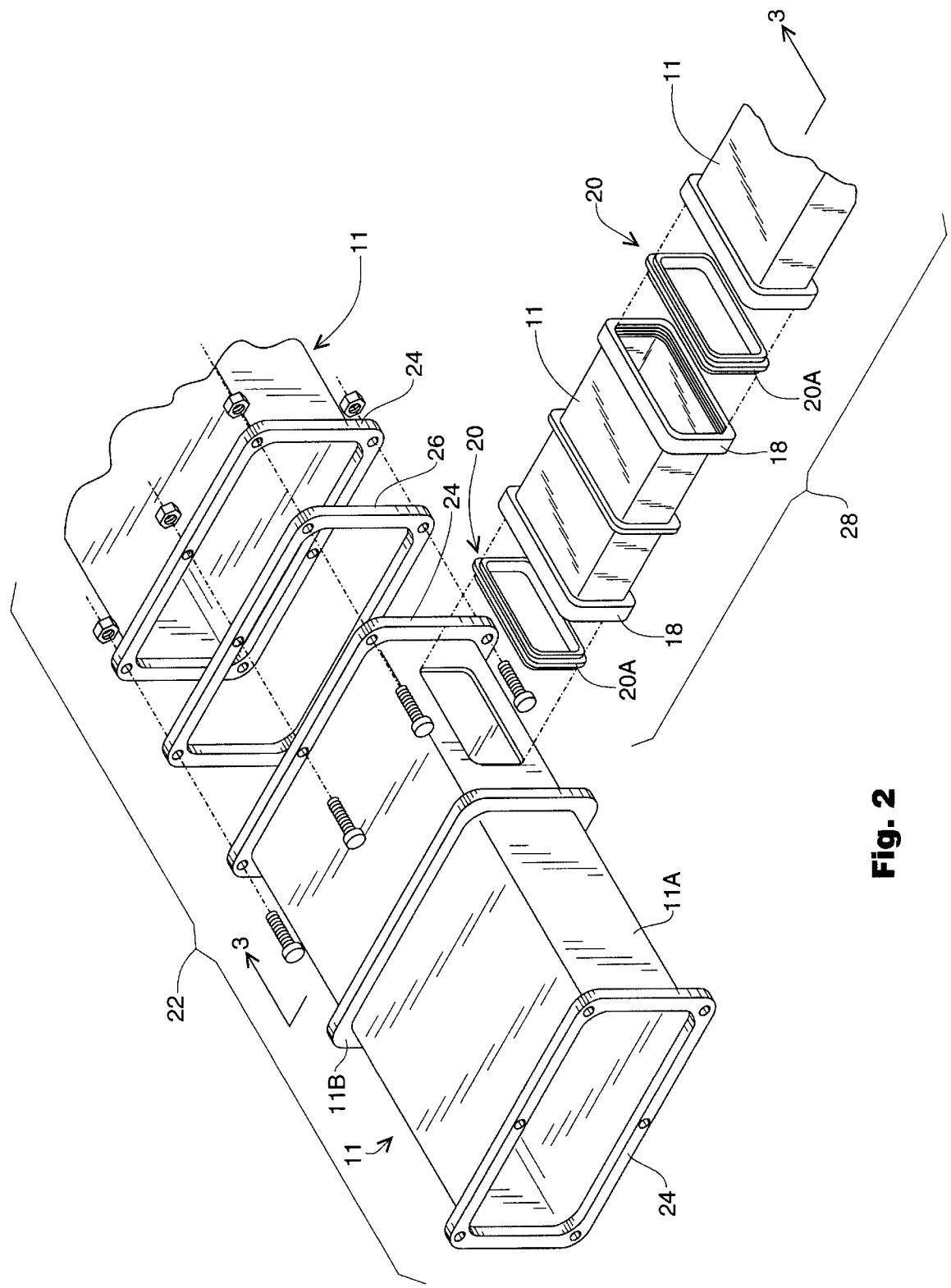
FIG. 2 is a partial exploded perspective view of one configuration of components in the duct system.

FIG. 2 is a partial exploded perspective view of one configuration of duct elements 11 in the duct system 10. The duct elements 11 of the trunk portion 22 of the duct system 10 are secured together using end flanges 24 which are bolted together in a manner which is similar to flanged piping systems. Also in a manner similar to flanged piping systems, gaskets 26 are seated between the end flanges 24; thus minimizing air leakage from or into the duct system 10.

Because of the larger duct elements 11 generally required for the trunk portion 22 of the duct system 10, these duct elements 11 are connected together as just described. Branch portions 28 of the duct system use the unique mating ends 18 and the unique connectors 20.

Figure 3:
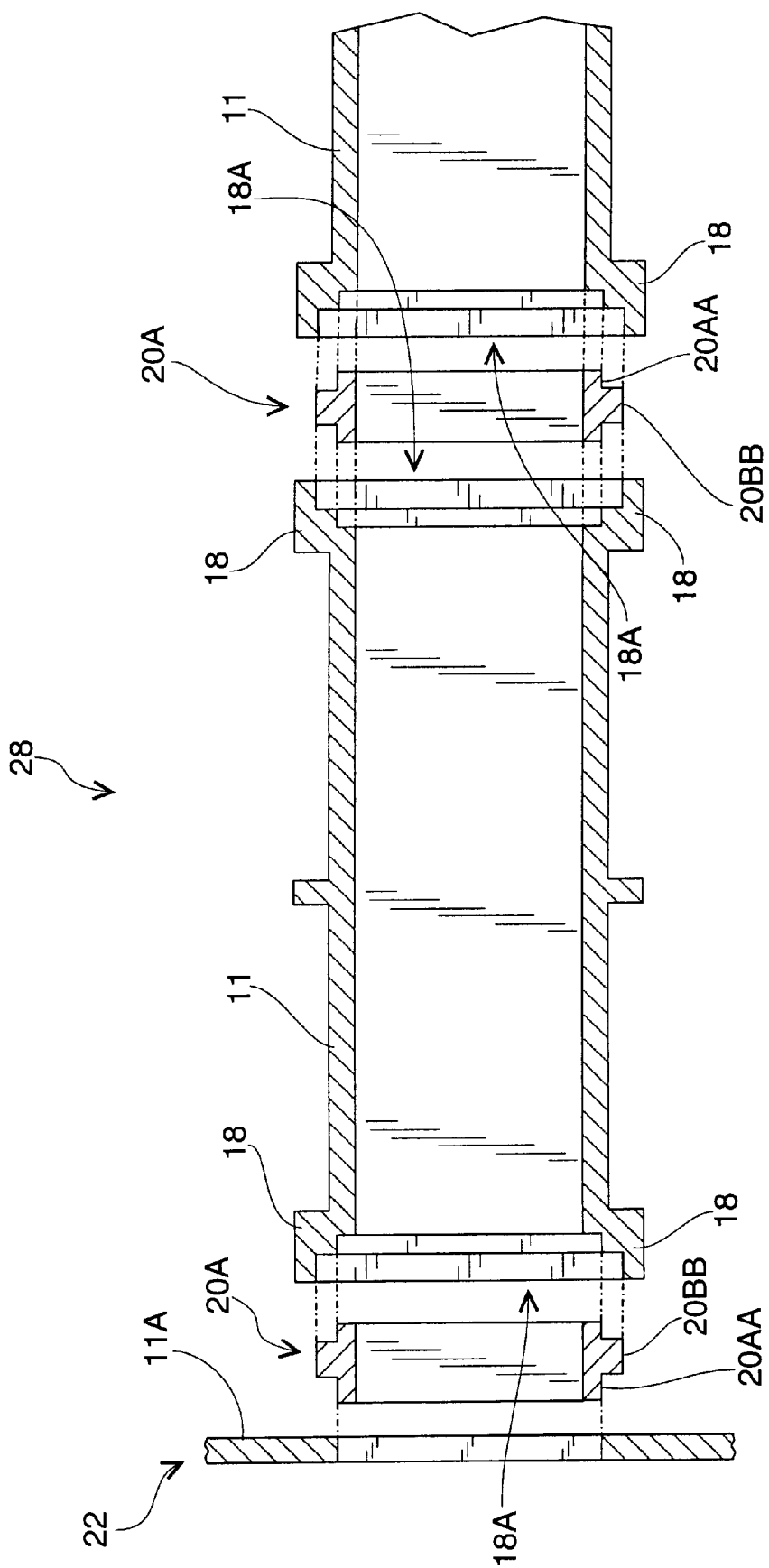
FIG. 3 is a cross-sectional view taken along line 3—3 of FIG. 2.

FIG. 3 is a cross-sectional view taken along line 3—3 of FIG. 2. The connectors 20 include internal connectors 20A, configured to conformingly fit within each of the mating ends 18 of adjacent duct elements 11. The internal connectors 20A each comprise a sleeve 20AA having an outwardly extended wall 20BB disposed about a perimeter of the sleeve 20AA. The mating ends 18 each have a stepped face 18A configured to conformingly mate with the internal connector 20A.

To connect the duct elements 11 together, the mating ends 18 are mated to each side of the internal connector 20A and the mating ends 18 are glued to each other. Because the mating ends 18 and the internal connectors 20A conformingly mate with each other, the duct elements 11 will be aligned with each other. The internal connectors 20A are glued to a side wall 11A of the duct element 11 wherever branch take-offs are made.

Although the internal connectors 20A shown above are for use with rectangular duct elements 11 as shown, the internal connectors 20A may also be round for use with round duct elements 11.

Figure 4:
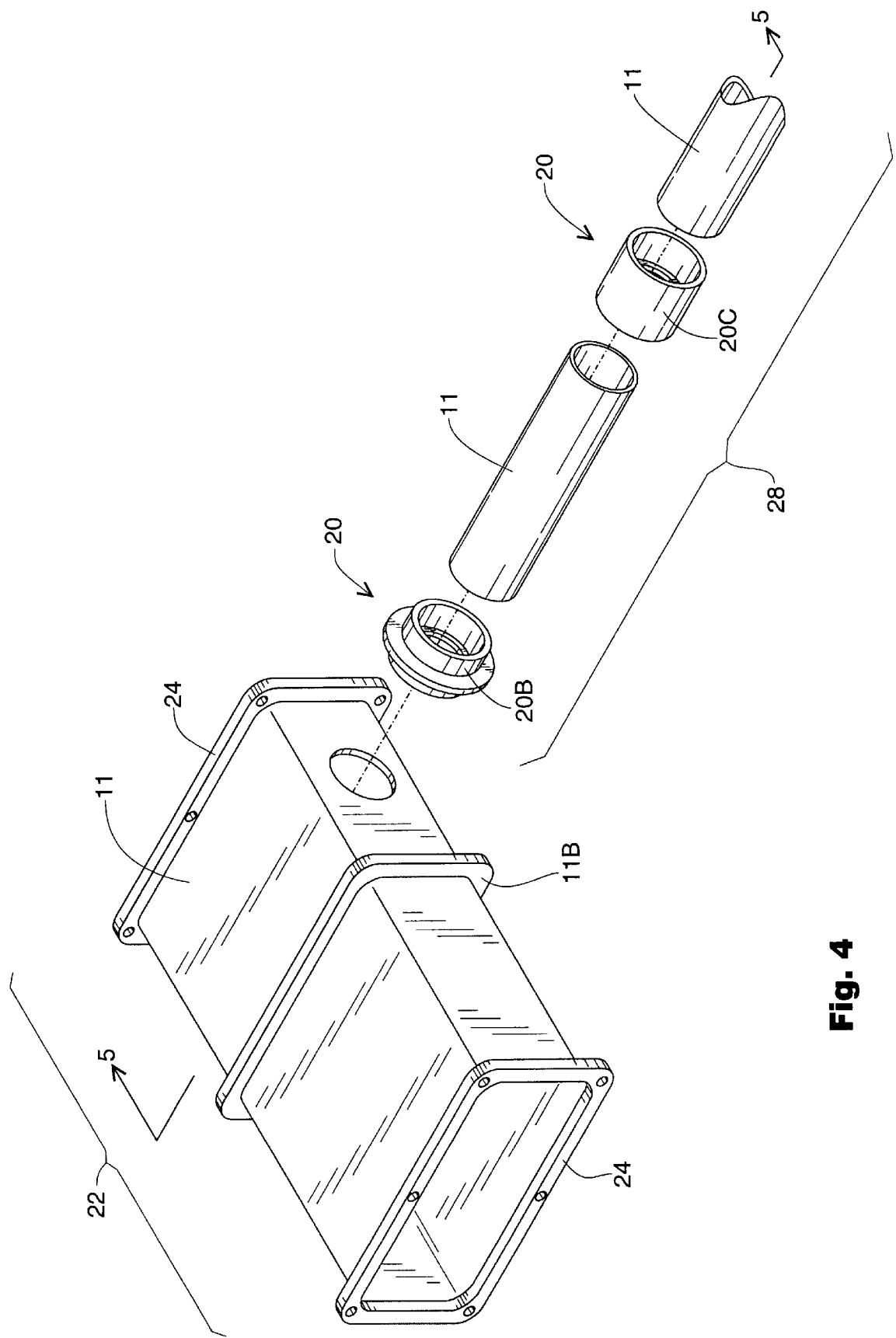
FIG. 4 is a partial exploded perspective view of another configuration of components in the duct system.
Figure 5:
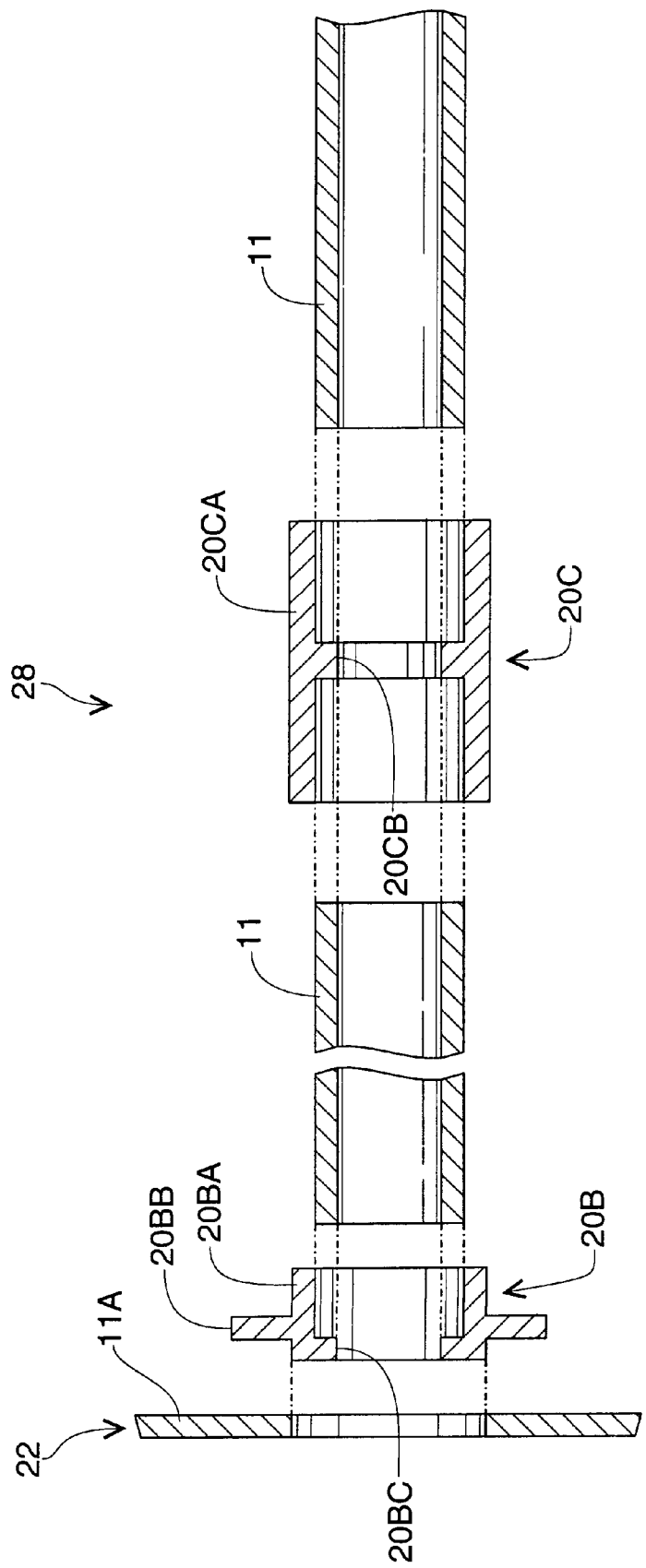
FIG. 5 is a cross-sectional view taken along line 5—5 of FIG. 4.

FIG. 4 is a partial exploded perspective view of another configuration of components in the duct system 10. FIG. 5 is a cross-sectional view taken along line 5—5 of FIG. 4. Referring to FIGS. 4 and 5, the connectors 20 also include external take-off connectors 20B and external in-line connectors 20C. These external connectors 20B, 20C are necessary whenever duct elements 11 have been field cut, and the mating ends 18 (FIG. 3) are thus removed.

The external take-off connector 20B comprise a sleeve 20BA having an outwardly extended wall 20BB disposed about a perimeter of the sleeve 20BA. An inwardly extended wall 20BC is disposed about an interior of the sleeve 20BA. The sleeve 20BA is configured to receive the duct element 11 therein, until the duct element 11 butts against the inwardly extended wall 20BC. The outwardly extended wall 20BB is glued to the side wall 11A of the duct element 11 of the trunk portion 22 of the duct system 10. The duct element 11 is glued to the interior of the sleeve 20BA and to the inwardly extended wall 20BC.

The external in-line connector 20C comprises a sleeve 20CA and an inwardly extended wall 20CB disposed about an interior of the sleeve 20CA. Two duct elements 11 are received within the sleeve 20CA through opposite ends of the external in-line connector 20C until the duct elements 11 butt against the inwardly extended wall 20CB. The duct elements 11 are glued to the interior of the sleeve 20CA and to the inwardly extended wall 20CB.

The present invention is not limited to the duct elements 11 shown, and can include any type of duct element 11 known in the art, such as elbows (not shown).

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. Accordingly, the scope of the invention is to be limited only by the following claims and their legal equivalents.

The invention claimed is:

1. A duct system comprising:

at least one connector comprising a generally rectangular sleeve having a pair of outwardly extending wall portions disposed about a perimeter of said sleeve;

each said outwardly extending wall portion defining a first double stepped portion comprised of a pair of outwardly facing step surfaces and an intervening surface;

a plurality of duct elements, each of said duct elements having at least one generally rectangular mating end, each of said mating ends having a second double stepped portion configured to engage one of said first double stepped portions by conformingly mating with the respective said pair of outwardly facing step surfaces and said intervening surface, and said connector being configured to conformingly fit within said mating ends, respectively;

wherein said duct elements can be aligned and connected together by fitting one of said at least one connector within said mating ends of two of said duct elements and gluing the respective said mating ends to each other.

2. The duct system of claim 1, wherein the duct elements and the at least one connector are made of plastic.

3. A method of assembling a portion of a duct system comprising:

providing at least one connector comprising a generally rectangular sleeve having a pair of outwardly extending wall portions disposed about a perimeter of said sleeve, wherein each said outwardly extending wall portion defines a first double stepped portion comprised of a pair of outwardly facing step surfaces and an intervening surface;

providing a plurality of duct elements, each of said duct elements having at least one generally rectangular mating end, each of said mating ends having a second double stepped portion configured to engage one of said first double stepped portions by conformingly mating with the respective said pair of outwardly facing step surfaces and said intervening surface, and said connector being configured to conformingly fit within said mating ends, respectively;

fitting one of said at least one connector within said mating ends of two of said duct elements to align said duct elements, and gluing the respective said mating ends to each other.

4. The method of claim 3, wherein the duct elements and the at least one connector are made of plastic.

* * * * *